United States Patent [19]

Bilanin

[11] Patent Number: 5,762,448

[45] Date of Patent: Jun. 9, 1998

[54] SYSTEM FOR ALLEVIATING SCOURING AROUND SUBMERGED STRUCTURES

[75] Inventor: Alan J. Bilanin, Princeton, N.J.

[73] Assignee: Continuum Dynamics, Inc., Princeton, N.J.

[21] Appl. No.: 657,032

[22] Filed: May 29, 1996

[51] Int. Cl.$^6$ ........................................ E02B 3/02
[52] U.S. Cl. ........................... 405/73; 405/30; 405/211
[58] Field of Search .............................. 405/203–205, 405/211, 73, 74, 31, 30, 29, 16, 21

[56] References Cited

U.S. PATENT DOCUMENTS

| | | |
|---|---|---|
| 3,686,887 | 8/1972 | Bruce . |
| 3,859,803 | 1/1975 | Pedersen et al. . |
| 3,928,978 | 12/1975 | Larsen . |
| 4,019,332 | 4/1977 | Lamy . |
| 4,114,394 | 9/1978 | Larsen ........................ 405/25 |
| 4,188,153 | 2/1980 | Taylor ........................ 405/34 |
| 4,279,545 | 7/1981 | deWerk ........................ 405/211 |
| 4,632,600 | 12/1986 | Ito ........................ 405/30 |
| 4,717,286 | 1/1988 | Loer ........................ 405/74 |
| 5,011,327 | 4/1991 | Thiac ........................ 405/30 X |
| 5,178,489 | 1/1993 | Suhayda ........................ 405/21 |
| 5,590,979 | 1/1997 | Sullivan et al. ........................ 405/74 X |

FOREIGN PATENT DOCUMENTS

| | | |
|---|---|---|
| 61-277708 | 8/1986 | Japan . |
| 63-304812 | 12/1988 | Japan . |
| 829762 | 5/1981 | U.S.S.R. . |
| 1021691 | 6/1983 | U.S.S.R. . |
| 1108158 | 8/1984 | U.S.S.R. . |
| 1312130 | 5/1987 | U.S.S.R. . |
| 1441002 | 11/1988 | U.S.S.R. . |
| 1476040 | 4/1989 | U.S.S.R. . |
| 1546540 | 2/1990 | U.S.S.R. . |
| 1691453 | 11/1991 | U.S.S.R. . |
| 1691454 | 11/1991 | U.S.S.R. . |
| 1728335 | 4/1992 | U.S.S.R. . |
| 1738903 | 6/1992 | U.S.S.R. . |

OTHER PUBLICATIONS

Richardson, E.V. et al., "Evaluating Scour at Bridges," Fed. Highway Adm. Publication No. FHWA–IP–90–017, Hydraulic Engineering Circular, No. 18, Feb. 1991.

Shen, W.S. et al. (eds.), "Hydraulic Engineering '93", Proceedings of the 1993 conference of the Hydraulics Div. of ASCE, San Francisco, CA, Jul. 1993, pp. 1367 to 1372; 1379 to 1390.

Primary Examiner—Dennis L. Taylor
Attorney, Agent, or Firm—David M. Quinlan, P.C.

[57] ABSTRACT

A system for alleviating scouring damage at the base of a structure anchored in the bed of a body of liquid flowing at a velocity relative to the structure, such as a bridge pier in a river bed, comprises a plurality of hollow vehicle tires surrounding the structure in a matrix of plural stacks of tires connected together with their toroidal axes substantially aligned. Each stack comprises a predetermined number of tires so that the top surface of the matrix forms a predetermined angle relative to horizontal.

21 Claims, 10 Drawing Sheets

SYSTEM FOR ALLEVIATING SCOURING AROUND SUBMERGED STRUCTURES

STATEMENT OF GOVERNMENT RIGHTS

This invention was made with Government support under Grant No. III-9360793 awarded by the National Science Foundation. The Government has certain rights in this invention.

BACKGROUND OF THE INVENTION

1. Field of the Invention

The present invention relates to alleviating scouring around submerged structures and, more particularly, to alleviating scouring at the base of a structure submerged in a sedimentary bed of a fluid flow.

2. Description of Related Art

Bridges over waterways are a critical part of a nation's infrastructure. Among all the bridges in the United States, for example, nearly a half million span waterways. The technical design of bridges in a river environment is a persistent problem, particularly the issue of sediment transport ("scouring") in the vicinity of submerged bridge piers and abutments. This effect weakens the support of the foundations at the sedimentary river bed, and in severe cases can cause bridges to fail and collapse. At present, thousands of bridges in the United States and abroad are reported as "scour critical" and the rest are continuously being jeopardized by scouring at the piers and abutments. Moreover, the scouring damage on bridges increases during floods when the flow rate is increased. Based on the results of recent reports, the direct and indirect monetary losses from the resulting damage can total up to one-hundred million dollars annually. The protection of bridges from local sediment scour is therefore an immediate issue not only from the point of view of cost and inconvenience caused by bridge failure, but also because it raises serious public safety concerns.

A primary cause of scouring is depicted in FIG. 1, which is a schematic diagram of a bridge pier 10, having a diameter D, anchored in the sedimentary bed 20 of a river flowing at a free-stream velocity U. The river bed is considered to be comprised of non-cohesive grains of sand with a mass density $\rho$, and a median grain size $D_{50}$. The river has a depth h from the surface of the bed 20 to the free surface 30 of the river. FIG. 1 shows the coordinate system used throughout, in which x is the direction of the free-stream velocity U and y is parallel to the river bed, making z normal to the river bed.

At the river bed, a boundary layer is formed with a thickness $\delta$. The impingement on the pier 10 of the fluid stream in the boundary layer creates circulation $\Gamma$ in the flow, thus creating a "horseshoe" vortex 40 trailing the pier 10 on both sides (only one side being shown in FIG. 1 for the sake of clarity). This horseshoe vortex 40 creates strong shear stresses at the river bed surface, which causes the sediment comprising the river bed 20 to be lifted up into the free-stream flow, where it is entrained and carried away from the pier. When a sufficient amount of the river bed at the pier is removed, the pier foundation is undermined and bridge failure results.

To alleviate this scouring, there are two basic approaches. One approach attempts to predict the scouring effects of the stream in which the bridge is to be placed and then to design a fail-safe pier based on that analysis. That approach has proven less than satisfactory because available scour-prediction equations are inadequate to predict the scouring actually encountered in practice. The second approach attempts to devise countermeasures against scouring.

Several such countermeasures have been proposed. The most widely used involves dumping stones into scour holes already formed or in the vicinity of the submerged structure that is subject to scouring. This so-called "riprapping" has been the subject of substantial study.

To predict the proper size and weight of the rocks of the riprap for a given pier configuration, the shear stress and the velocities acting on the rock layer have to be determined correctly in a very complex vortical flow. Moreover, the turbulent boundary layer over the riprap evidently introduces irregular fluctuations of force on the rocks. In high-speed flow, for example during floods, vortices are also shed from the back of the rocks, and rocks further downstream are therefore subjected to the cumulative non-linear effects of the pulsations originating upstream. The velocities and shear stress over the rocks become still more complicated, and it follows that an accurate determination of the choice of rock size and distribution is not straightforward. In spite of extensive studies undertaken over the last decades and up to the present, there is no generally accepted analysis to determine the size and layout of rocks for a suitable riprap configuration.

Other countermeasures have been suggested by various researchers to mitigate sediment transport around submerged bridge structures. They include the installation of small piles upstream of the pier, a vertical strip upstream of a rectangular pier, a vertical lip surrounding the foundation caisson, and a delta wing in front of the pier. Recent research also includes the investigation of grout bags, grout mats, footings, and cable-tied concrete blocks, fenders and tetrapods. Most of these investigations showed a certain degree of improvement in terms of scour reduction. However, these efforts were conducted under very specific experimental conditions and the empirical results appear to be applicable only to those specific conditions. No further success has yet been attained in formulating a general law for different flow conditions and pier shape in practical applications. The need for a system which will allow bridge engineers to prevent local scour in the design and maintenance of submerged bridge structures is thus very pressing.

A seemingly totally unrelated problem is the serious environmental issue created by the accumulation of immense numbers of used vehicle tires, which are virtually useless once they have outlived their primary purpose. Scrap tire disposal has proven to be one of the most intractable environmental problems being faced today.

Based on recent reports, there are about 3 billion scrap tires stockpiled across the nation and an additional 240 million more are discarded every year. Besides being unsightly, scrap tires provide breeding sites for rodents, mosquitoes and other pests. Moreover, they occasionally causes fires that are hard to extinguish and create a massive stew of toxic waste contaminating the atmosphere as well as the nearby habitat (one tire fire burned continuously for nine months). Various methods have been recommended for the recovery or reuse of discarded tires, including incineration, artificial reef construction, retreading, use in manufacturing asphalt paving materials, sludge composting and energy recovery. In spite of these various recycling channels, the present demand for scrap tires totals only 6.6% of the available supply. Additional scrap tire recycling methods are needed to resolve the stockpiling of this solid waste.

SUMMARY OF THE INVENTION

It is an object of the present invention to solve the problems caused by scouring using hollow, elongated members that preferably constitute stacks of used vehicle tires, thus at the same time alleviating the environmental problem posed by the accumulation of such tires.

In accordance with one aspect of the present invention, a system for alleviating scouring at the base of a structure anchored in a bed with a liquid flowing relative to the structure comprises a plurality of hollow, elongated members proximate to the structure forming a matrix of said members arranged around the structure and connected together with longitudinal axes thereof disposed substantially vertically, each of the members having a length sufficient to enable vortical flow to be induced therein by liquid flow over an end thereof.

In accordance with another aspect of the invention, a system for alleviating scouring comprises a pier anchored in a sedimentary bed with a liquid flowing past the pier, and a plurality of hollow, elongated members arranged to form a matrix of the members proximate to and completely surrounding the pier member in all directions and buried in the sedimentary bed, wherein the members are connected together with a longitudinal axis of each disposed substantially vertically, each of the members having a length sufficient to enable vortical flow to be induced therein by flow of the river over an end thereof.

In accordance with yet another aspect of the invention, a system for alleviating scouring at the base of a structure anchored in a bed with a liquid flowing relative to the structure comprises a plurality of used vehicle tires, means for securing the tires together to form a matrix for arrangement proximate to and around the structure and buried in the bed, the matrix including a plurality of stacks of the tires with toroidal axes thereof aligned to form a plurality of hollow, elongated cylindrical members having a longitudinal axis of each disposed substantially vertically, wherein each stack includes at least three tires, and means for anchoring the stacks of tires to either the bed or the structure or both.

In accordance with a still further aspect of the invention, a method of providing scour alleviation at the base of a structure anchored in a bed with a liquid flowing relative to the structure comprises the steps of excavating the bed to form a cavity proximate to the structure and having a predetermined depth, and installing in the cavity a plurality of stacks of used vehicle tires secured together with the toroidal axes thereof aligned to provide a matrix of the stacks arranged around the structure and connected together with a longitudinal axis of each disposed substantially vertically, each of the stacks including at least three tires.

BRIEF DESCRIPTION OF THE DRAWINGS

The above objects, features and advantages of the present invention will be readily apparent from the detailed description set out below, when taken in conjunction with the accompanying drawings, wherein.

DETAILED DESCRIPTION OF PREFERRED EMBODIMENTS

Figure 2:
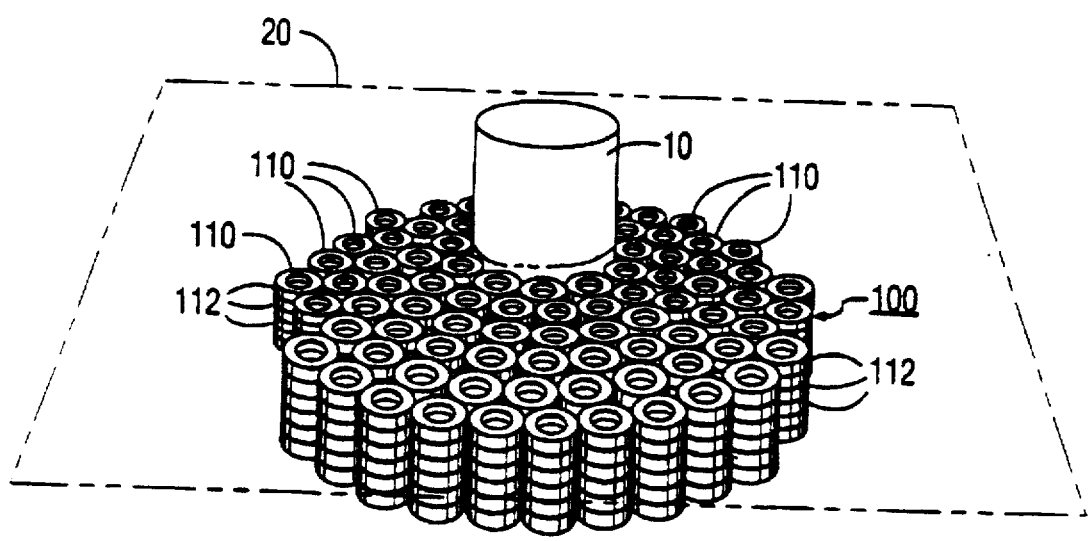
FIG. 2 is a perspective view of one embodiment of the present invention.
Figure 3:
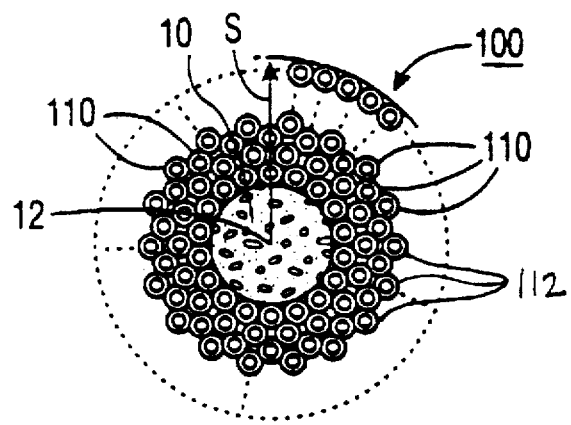
FIG. 3 is a top view of the embodiment of the invention shown in FIG. 2.

FIG. 2 is a perspective view of an embodiment of the system of the present invention. A circular bridge pier 10 has surrounding it a matrix 100 of stacks 110 of hollow toroidal members, preferably used conventional vehicle tires 112. In a typical such matrix according to the present invention, the stacks 110 extend to a predetermined radial distance S from the center 12 of the pier as shown in FIG. 3.

Figure 4:
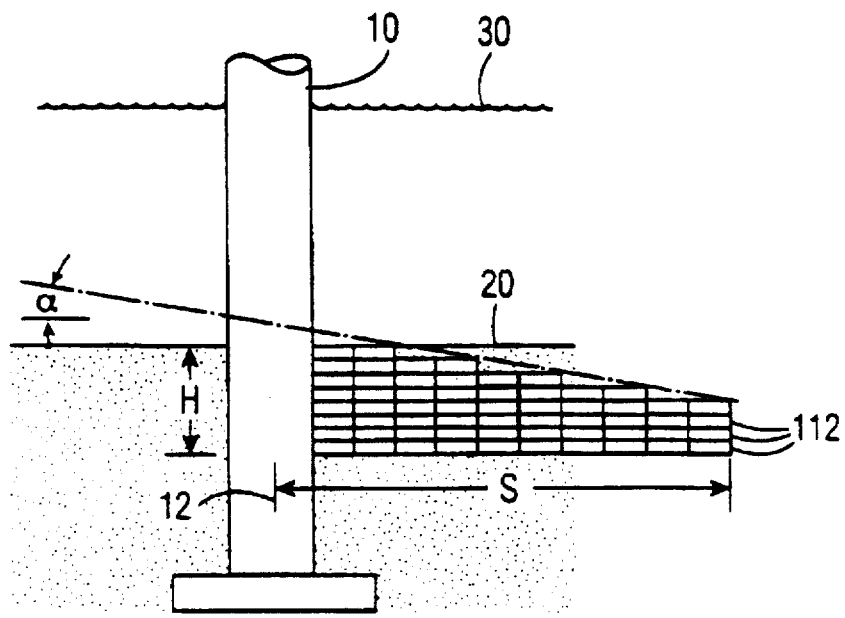
FIG. 4 is a side view of a preferred embodiment of the invention.

FIG. 4 is a cross-section of a preferred form of a matrix of the present invention in place around a pier 10. The matrix is typically buried in the river bed 20 when the river bed is at its normal position relative to the pier. That is, the riverbed 20 has a certain level when the velocity of flow in the river is at a normal, reference value. The matrix 100 is buried in the bed 20 at that level. To install the matrix around a bridge pier, the river bed at the pier is excavated to a depth that takes into account the angle α between the top of the matrix and the river bed. It is expected that installation of the matrix can be performed by dredging the bed without the necessity of creating a dam to expose the bed for excavation. The angle α is determined from river bed sediment transport characteristics, and thus influences the height H and the radius S of the matrix (which is typically circular, but can be other shapes in accordance with the present invention).

Figure 5:
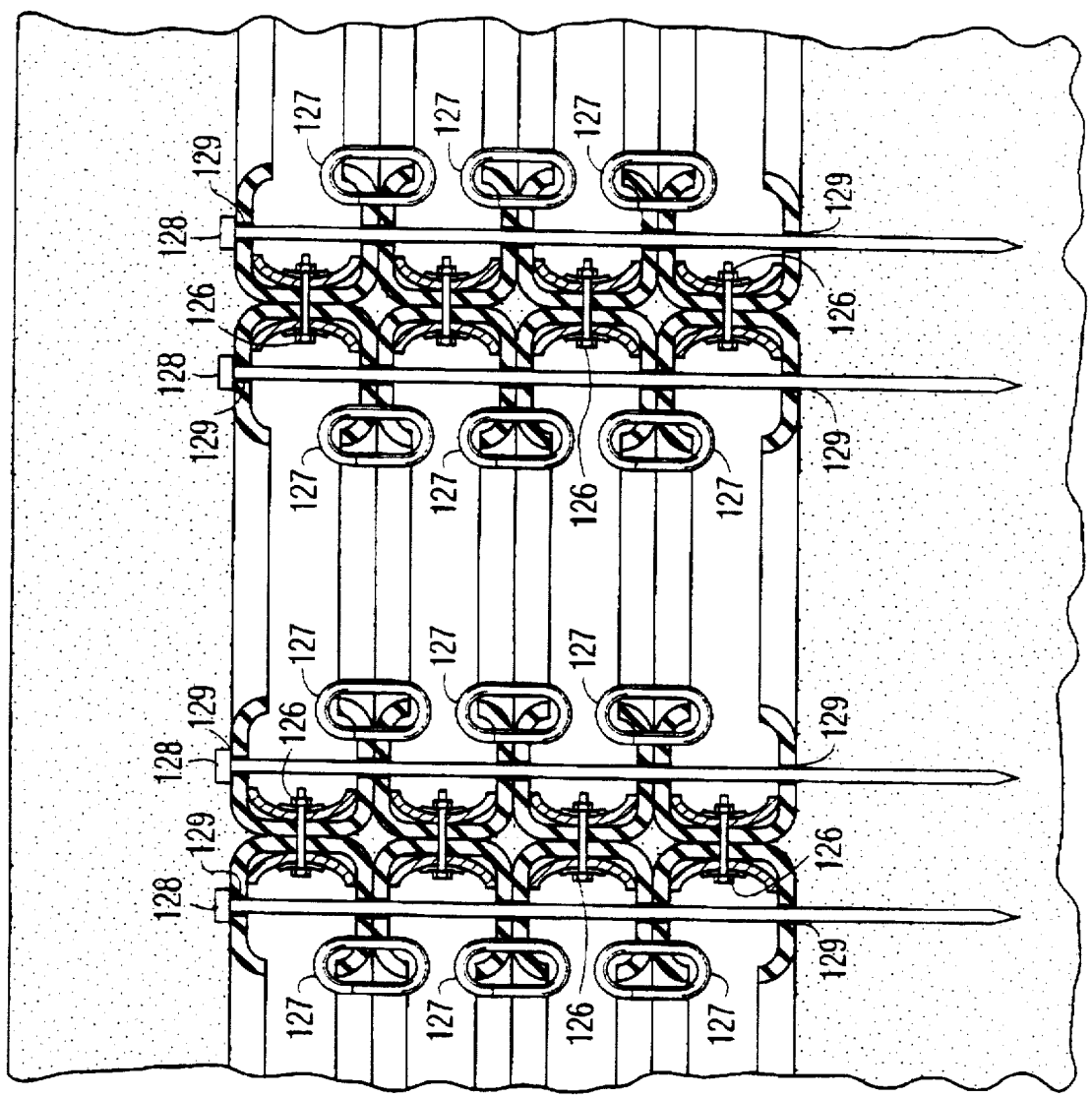
FIG. 5 is a sectional view of portions of adjacent stacks of hollow vehicle tires illustrating how they are secured together and anchored to a sedimentary riverbed to form a matrix surrounding a bridge pier in the river bed.
Figure 7:
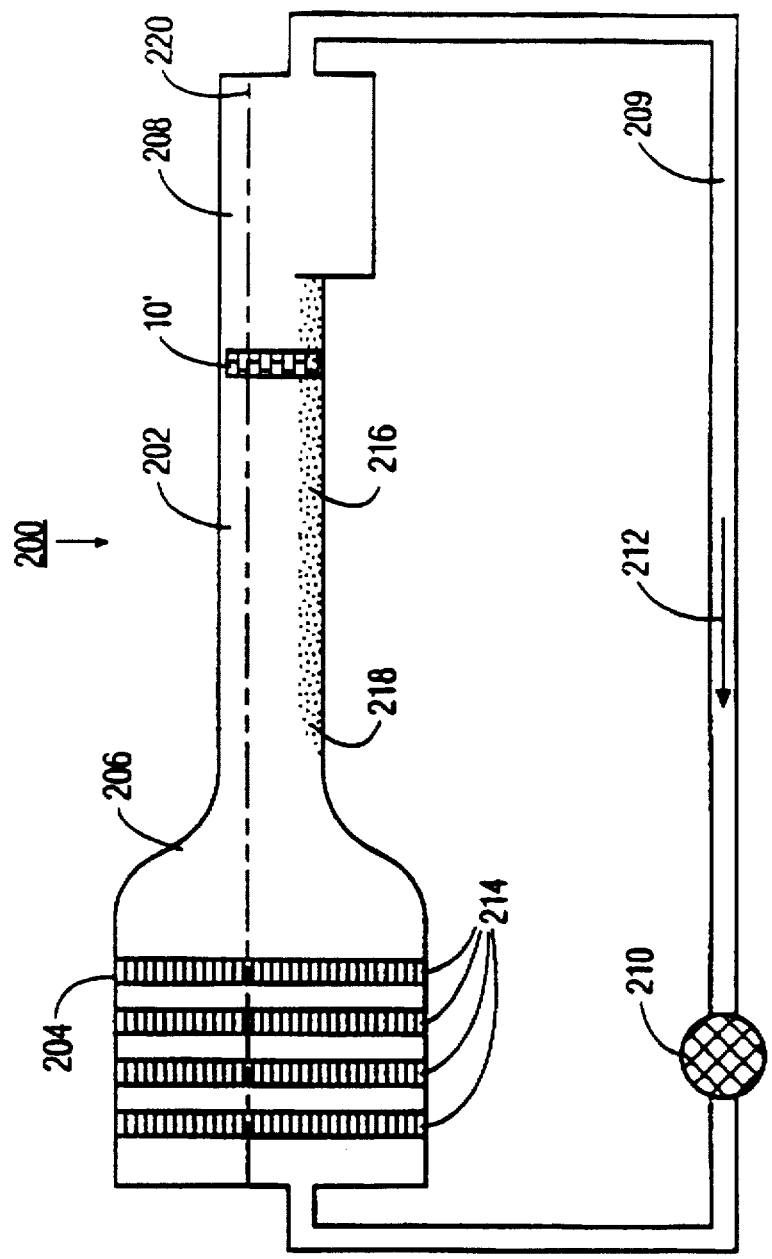
FIG. 7 illustrates a test flume used for conducting experiments demonstrating the efficacy of the present invention.

The tires 112 are secured to each other around the bridge pier by any suitable means, and can be anchored in the stream bed. FIG. 5 shows brackets 126 and 127 for connecting adjacent tires together. The brackets 126 and 127 are like those shown in FIGS. 7A and 7B of U.S. Pat. No. 5,178,489, but any suitable brackets can be used to attach the tires together. (See, for example, Soviet patent SU 1476040.) Moreover, additional brackets similar to brackets 126 can be used to secure the tires to the structure to be protected from scouring. In addition, stakes 128 can be driven through holes 129 in the tires 112 and into the bed to anchor the tires 112 and provide a stable matrix around the structure to be protected. Other, or additional, securing means can be used in addition or instead of those just discussed. For example, the matrix can be held in place to the structure by cables or cable netting around the stacks of tires, and such cables or cable netting can be used at selected radial positions as the matrix is being assembled in place around the pier.

Figure 6:
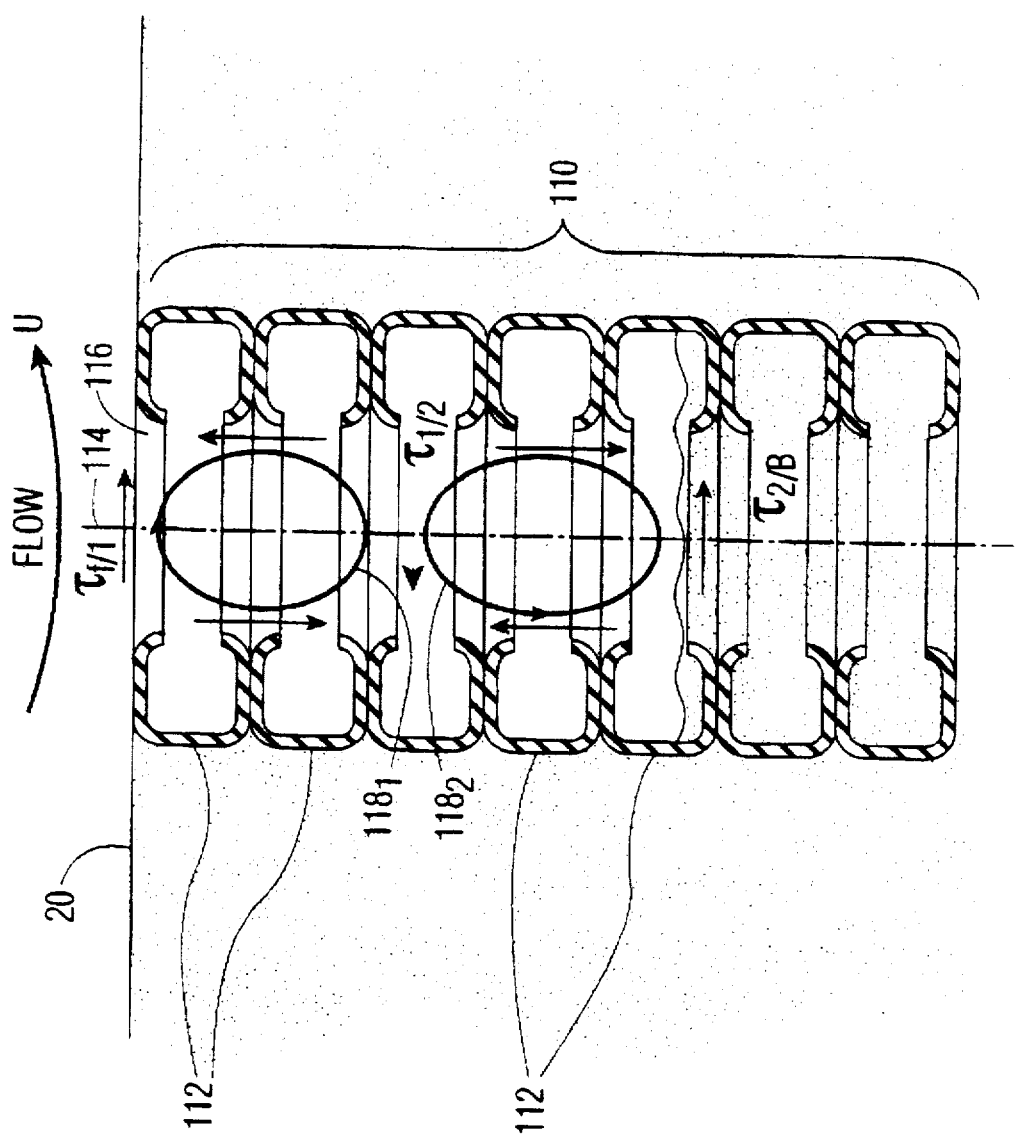
FIG. 6 is a sectional view of one stack of hollow vehicle tires, arranged according to the present invention, which illustrates a main principle underlying the present invention.

FIG. 6 illustrates a principle believed to underlie the ability of the present invention to limit the extent of scouring around structures submerged in a flowing stream. The matrix is formed by tires 112 in stacks 100 formed by plural tires arranged with their toroidal axes 114 aligned to form a plurality of a hollow cylindrical members that provide cavities 116, one of which is shown in cross-section in FIG. 6.

Figure 1:
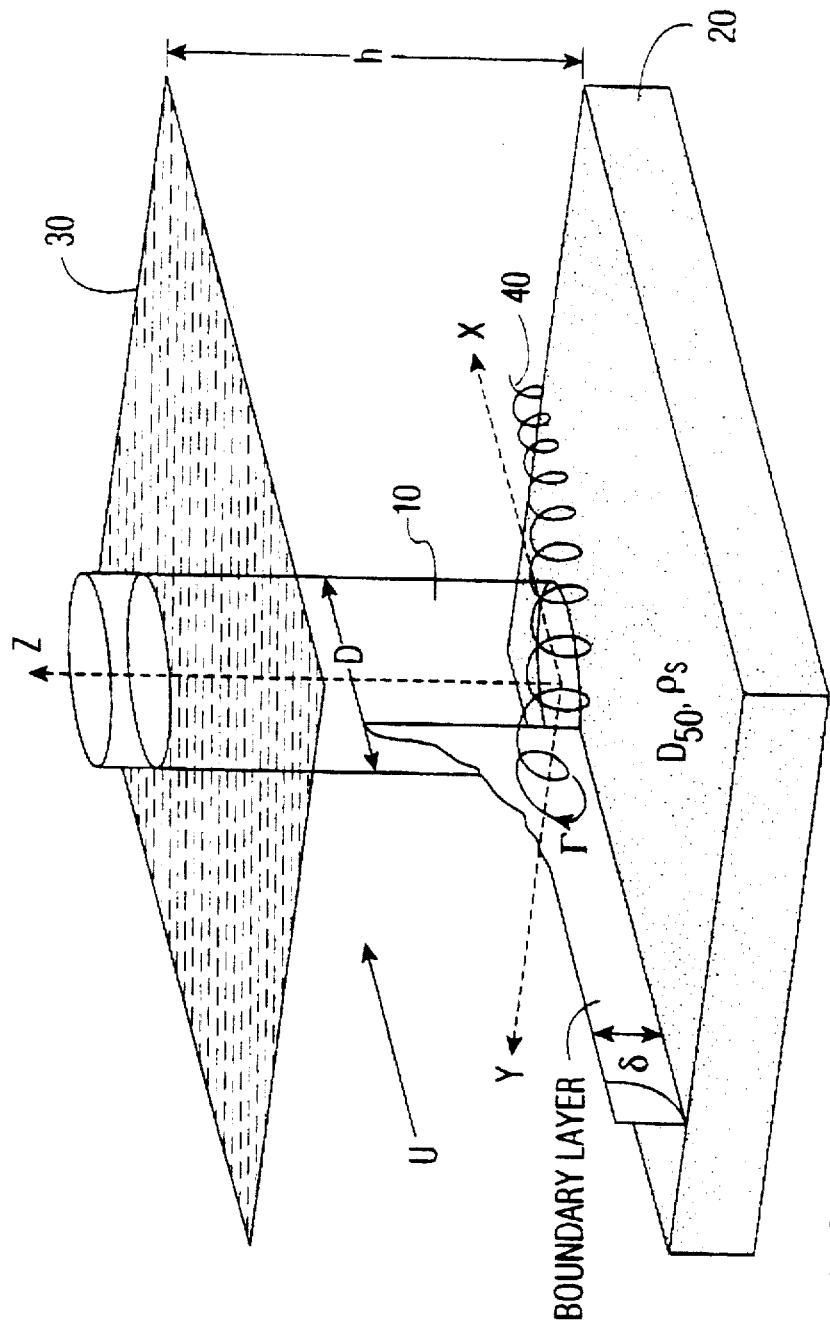
FIG. 1 depicts a model of the flow around a pier anchored in a sedimentary bed of a flowing stream.

The flow over the hollow cavity 116 formed by each stack 110 of tires 112 creates vortices 118 in the cavity, such vortices being represented schematically in FIG. 6. The number of vortices 118 that are created in a cavity of a given diameter depends on the depth of the cavity, which in turn depends on the velocity U of the flow of the river. The present invention limits scouring because it weakens the horseshoe vortex system (see FIG. 1). The transfer of shear stress to the vortices 118 applies a torque to the horseshoe vortex system, thereby reducing its strength.

As noted above, the matrix 100 is installed by burying it in the bed around the pier 10 or other structure. As the flow velocity U increases, the bed 20 in the immediate vicinity around the pier 10 begins to be removed by the scouring action described above in connection with FIG. 1. That exposes one or more innermost stacks 110 of tires. As the velocity U of the river increases, the scouring action created by the complex flow around the pier 10 (see FIG. 1) becomes more violent and more of the bed 20 inside an innermost stack 110 is carried away, until enough of a cavity is formed to cause a vortex $118_1$ to be formed. This initial vortex $118_1$ will reduce the shear stress $T_f$ exerted by the flow because energy from the flow is required to maintain the vortex, while energy represented by such flow is dissipated by the highly irregular inner surfaces of the tires 112.

If the flow velocity U increases, the vortex $118_1$ will itself have sufficient energy to begin to scour the bottom of the cavity 116, until the cavity eventually becomes deep enough to contain a second, counter-rotating vortex $118_2$. Stated another way, the shear stress T transmitted from the flow in the river to the first vortex $118_1$, can be expressed as $T_{f1}$. When the shear stress exerted by the first vortex $118_1$ on the sediment at the bottom of the cavity 116 exceeds the shear stress $T_{SED}$ required to entrain sediment in the flow, the depth of the cavity 116 begins to increase. Where a second vortex $118_2$ is formed, shear stress $T_{1/2}$ is transmitted thereto from vortex $118_1$. As long as the shear stress $T_{2/B}$ exerted by the second vortex $118_2$ on the sediment at the bottom of the cavity 116 is less than $T_{SED}$, the cavity will remain at the depth shown in FIG. 5. If the velocity U increases, the energy in the vortex $118_2$, and thus $T_{2/B}$, will increase and a third vortex may be formed.

The invention limits scouring because the shear stress at the bottom of the cavity is much less than the shear stress that would be applied by the horseshoe vortex system directly. Additionally, the transfer shear stress weakens the horseshoe vortex system, as previously described. The present invention alleviates the effects of scouring by limiting the extent to which scouring takes place, because it reduces the velocity of the flow at the stream bed to a value that is low enough that it cannot entrain sediment (that is, $U<U_{crit}$), within a finite, controlled distance from the submerged structure subject to scouring.

The flow around a submerged structure such as a bridge pier is complex, and excavation of the river bed by scouring can take place in all directions. That is, the scour hole around a submerged structure tends to extend in both the x and y directions shown in FIG. 1, with the depth increasing toward the pier because the more violent scouring action occurs proximate to the structure, with the scouring diminishing as the distance from the structure increases. In addition, because the stream can flow past the structure in various directions (for example, wave or tidal motion is multidirectional and rivers can change course), the matrix 100 generally will extend symmetrically in the x and y directions.

The top of the matrix of the present invention in its preferred form forms an angle α with the surface of the bed, as shown in FIG. 4. As that figure shows, higher stacks are placed closer to the submerged structure because they are capable of dissipating more energy (because they will accommodate more counterrotating vortices, as will be appreciated from FIG. 6). Preferably, no stack will have fewer than three tires, since it will be difficult to create the vortical flow represented schematically in FIG. 6 in a cavity with a depth of fewer than three tires.

The exact geometry of the matrix 100, including the angle α, will depend on the environment in which the matrix is installed. However, since used vehicle tires are in abundant supply, it is contemplated that very large matrices, consisting of enough stacks of tires in a radial direction so that S is large relative to D, will be used to be certain that scouring is alleviated under the most severe flow conditions (such as drastic flooding). One of the advantages of the invention is the ease with which a large matrix can be installed once the conditions for excavating a river bed or other flowing body of fluid have been established. That is, once the equipment is in place for creating the necessary excavation, it is relatively simple to provide as large a cavity for accepting the matrix 100 as is desired.

Moreover, it is anticipated that the parameter α will prove to be more critical in practice than either the height of the innermost cavity or the radius S of the matrix. The angle α is expected to be important for a variety of reasons. As more stacks of tires are exposed radially from the submerged structure, the presentation of a sloped surface to oncoming flow will assist in dissipating the energy in the flow. In addition, providing a sloped surface prevents the periphery of the matrix from becoming exposed to the flow. If the periphery were exposed, the bed would be prone to scouring around the matrix itself. The parameter α will, it is expected, depend mostly on the median grain size $D_{50}$ of the sediment in the stream bed. That is, smaller grains can be entrained more readily and thus will require a larger value of α. In any case, it is contemplated that α will be determined experimentally for any given set of flow conditions.

As noted above, increasing flow velocity uncovers more and more stacks 110 further and further from the bridge pier. Then, when the flow velocity decreases, sediment entrained in the flow will tend to re-bury the matrix 100. That is, the cavities created by the vortical flow patterns set up inside the stacks of tires will re-fill with sediment, since the level of the bed is determined by hydrological factors independent of the presence of the matrix in the stream bed.

Those skilled in the art will appreciate that the hollow, elongated cavities with vertical axes formed by stacks of tires in a preferred embodiment of the invention can in fact be provided in any suitable manner. For example, an integral honeycomb structure could be used, or other toroidal bodies besides vehicle tires could be stacked to form the matrix of the present invention. If other types of structure are used to form the cavities, they preferably will have irregular inner surfaces like those provided by the side walls of used tires in order to attenuate the energy in the vortical flow, as discussed above. However, it will be apparent that given the advantages of using vehicle tires for the matrix, and the environmental problems caused by the continuing accumulation of used vehicle tires, a preferred embodiment of the invention incorporates used vehicle tires to provide the stacks 110 comprising the matrix 100.

To study the relative effectiveness of the scour mitigation device of the present invention, subscale experiments were set up to measure the evolution of the local scour in the vicinity of a retrofitted bridge pier. The stacked-tire matrix was built with model rubber tires tested in a recirculating water flume 200 depicted schematically in FIG. 7. In the investigation, the bridge pier was represented with a circular cylinder 10' with a diameter D of 3.25 inches and a height of one foot.

The flume had an open channel testing section 202 that was 8 feet long by 1.5 feet wide by 1 foot deep. The water flowed from a settling chamber 204 into the testing section 202 through a contraction unit 206 and continued to a dumping section 208. It was then pumped back through a recirculation channel 209 to the settling chamber 204 for successive cycles with a 6 inch propeller pump 210 driven by a 0.75 horsepower electrical motor (not shown). The arrow 212 indicates the flow direction. The flow rate of the flume was controlled by a vernier dial that regulates the speed of the motor. The settling chamber 204, the testing section 202 and the dumping section 208 of the facility were made of plexiglass while the contraction unit 206 was made of brass. Inside the settling chamber, there were four honeycombs 214 that served as flow straighteners. To model the sedimentary riverbed 20, three inches of non-cohesive marine sand 216 were laid on the bottom of the entire testing section, except for 24 inches near the front end 218 of the testing section, where the sand was ramped up linearly from zero to the three-inch thickness. The median grain size ($D_{50}$) of the sand used in the experiment was 0.0098 inch (0.25 mm) in diameter. During the test, the sand being carried away from the testing section by the flow was deposited downstream in the dumping section 208 so that the recirculating water was kept clear from any sediment.

To prepare the flume for examining scouring effects, the flume was filled up to the desired flow depth 220 in the testing section. Before installing the model in the testing section, the vernier control of the motor was calibrated for different flow velocities. The calibration was done by correlating the vernier readings with the free-stream velocity in the testing section for a giving flow depth. The flow velocity U was taken as the surface velocity, which was measured by timing a small piece of buoyant material floating down a 3 foot distance in the testing section.

When the pier model 10' was mounted into the sand bed 216 of the testing section, it was positioned between the sidewalls of the testing section 66 inches downstream from the inlet of the testing section 202. This was intended for flow symmetry around the pier model 10' and to provide sufficient distance for the boundary layer to be developed in the flow approaching the pier. The model of the scour mitigation matrix of the present invention (see FIG. 2) was buried 0.25 inch below the bed surface of the sand bed 216. The model of the matrix of the present invention used for the tests had "tires" with a one inch outside diameter and a 0.625 inch inside diameter (measured across the edges of the tire rim), and 0.375 inches thick. The stack was six tires deep, with an angle $\alpha=0$. The matrix was symmetrical in the x and y direction with a radius S of 6.1 inches.

Before the flume was turned on for each test, the sand bed was carefully smoothed with a tool specially designed for the purpose to remove any undulating surface that could cause unfavorable disturbances to the stream. The vernier was dialed to the specified flow rate and the flume was turned on for twenty minutes. During this testing period, measurements of the maximum scour depth in the vicinity of the pier were taken every 2 minutes. The length ($x_s$) and width ($y_s$) of the scour hole thus developed were also measured.

For baseline data, the circular pier model 10' having a diameter D, without any scour inhibiting structure in place, was tested in the flume 200. Once the water flow was started, the local scour was found to initiate at the junction between the pier and the sand bed. It then developed into an essentially symmetrical, bowl-shaped depression around the pier. Considering the point where the flow impinges on the pier to be the 0° point on the pier circumference, the maximum scour hole depth occurred at about ±40°. While the scour hole enlarged as it evolved, the rate of erosion inside the scour hole was found to decrease with time. Besides the development of this bowl-shaped local scour hole, the sand bed further downstream of the pier was found to develop into a wavy surface. Through flow visualization with color dye, these wavy sand dunes were identified as the major consequence of the von Karman wake shed behind the pier. Since the depth of these dunes was smaller than that of the local scour hole, and because the support for the bridge pier depends primarily on the sand in the vicinity of the pier, the eroded sand dunes at remote downstream distance from the pier were considered to be less significant than the local scour problem caused by the horseshoe vortex (see FIG. 1).

To evaluate the scouring effect quantitatively, several parameters were measured and/or calculated. The depth of the scour hole $d_s$ was measured over time for various flow conditions, performing tests at various flow velocities (U) and flow depths (h). Tests were run at three flow velocities, 0.73 ft/sec, 0.82 ft/sec and 0.95 ft/sec, with the flow depth h maintained constant. Different tests were run at a constant flow velocity of 0.82 ft/sec, with three different flow depths (expressed by the dimensionless parameter h/D).

The Reynolds number Re ($=UD/\nu$) and Richardson number Ri ($=\eta D_{50}g/U^2$) for each flow was calculated. As those skilled in the art appreciate, $\nu$ is the kinematic viscosity of water and $\eta=(\rho_s-\rho)/\rho$ (where $\rho$ is the fluid's mass density), so that $\eta$ represents the relative density of the sediment in water. The Reynolds number and Richardson numbers for the various velocities are tabulated below:

| U (ft/sec) | Re | Ri |
|---|---|---|
| 0.73 | $1.8 \times 10^4$ | .083 |
| 0.82 | $2.1 \times 10^4$ | .065 |
| 0.95 | $2.4 \times 10^4$ | .048 |

The Reynolds number Re is an indication of the flow conditions in the boundary layer of a fluid flow. Since the impingement of the boundary layer on the bridge pier is a significant factor in scouring (see FIG. 1), it is expected that Reynolds number will prove to be an important parameter in analyzing scouring. The velocity and pier size were chosen (consistent with the capabilities of the test flume) to give Re values approximating those expected in full-scale flow.

The Richardson number Ri is an indication of the tendency of the river bed sediment to settle due to the force of gravity, as opposed to being transported by forces exerted by the flow. Clearly, it is an important parameter in analyzing scouring. In these tests, a grain size $D_{50}$ was chosen to give Ri values that would assist in predicting scouring conditions in full-scale flow.

Figure 8A:
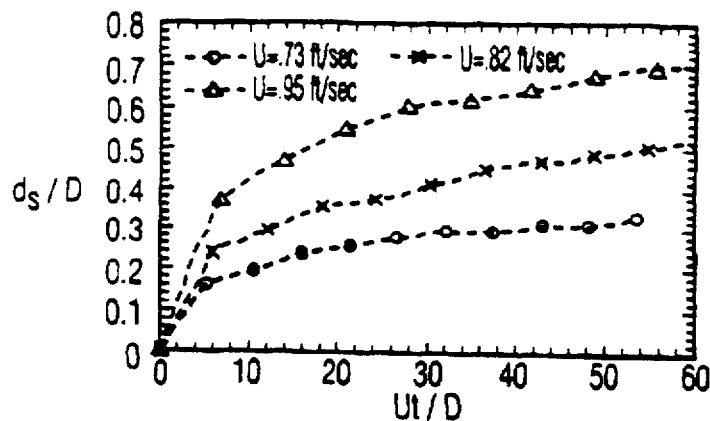
FIGS. 8A to 8D and 9A to 9D plot the results of tests on models of an unprotected, prior art bridge pier (FIGS. 8A and 9A), an embodiment of the present invention (FIGS. 8B and 9B), a bridge pier with a strake (FIGS. 8C and 9C), and a bridge pier with washers (FIGS. 8D and 9D), all of which tests were conducted in the flume depicted in FIG. 7.
Figure 9A:
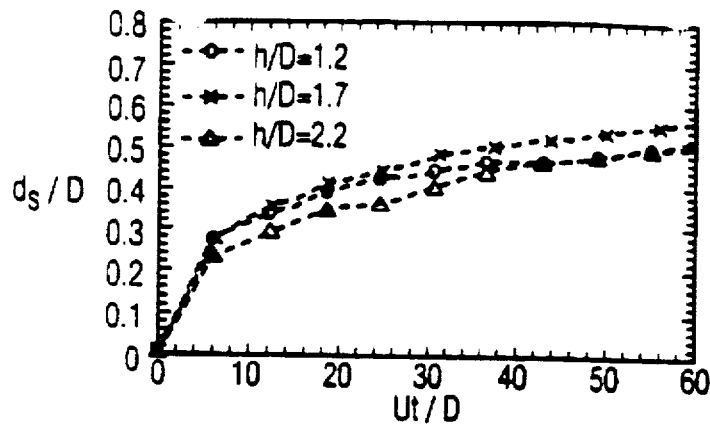

The results of the tests on the prior art, unprotected circular bridge pier model 10' are plotted in FIGS. 8A and 9A.

FIG. 8A plots maximum scour hole depth $d_s$ (converted to the dimensionless parameter $d_s/D$) over time t (converted to the dimensionless parameter Ut/D) at a constant flow depth h (converted to the dimensionless parameter h/D) of 2.2. FIG. 8A shows that at any given time, both the maximum scour depth $d_s/D$, and the rate of erosion $d/dt(d_s/D)$, increase with increasing velocity.

This is believed to be because the increase in velocity results in an increase of the circulatory strength of the horseshoe vortex where the flow is separated. Because the vortex strength directly relates to the shear stress applied on the sand bed, the erosive effects thus become more intensive and result in a faster rate of sediment transport and a bigger scour hole.

A similar result is also reflected from the length and width of the scour hole measured for different flow velocities at the end of a twenty minute flume test, as shown in Table 1A.

TABLE 1A (h/D = 2.2)

| U (ft/sec) | $x_s/D$ | $y_s/D$ |
|---|---|---|
| 0.73 | 1.01 | 1.09 |
| 0.82 | 1.32 | 1.39 |
| 0.95 | 1.67 | 1.68 |

To determine the effects of flow depth on the development of the local scour around the pier, the evolution of the maximum scour depth at a constant Reynolds number of $2.1 \times 10^4$ (U=0.82 ft/sec) for different flow depths is illustrated in FIG. 9A and the corresponding lengths and widths of the resulting scour hole after twenty minutes of flume test were tabulated in Table 1B.

TABLE 1B (U = 0.82 ft/sec)

| h/D | $x_s/D$ | $y_s/D$ |
|---|---|---|
| 1.2 | 1.42 | 1.39 |
| 1.7 | 1.42 | 1.46 |
| 2.2 | 1.32 | 1.39 |

Both sets of results indicate that the local scouring process was relatively insensitive to changes of flow depth, as expected.

The model scrap tire matrix structure according to the present invention, as described above, was retrofitted to the circular pier model 10' and was buried 0.25 inch beneath the sand level, as discussed above. When flow in the flume was started, the local scour was initiated in a similar fashion as the unprotected pier until the matrix was exposed to the flow. Once the tires were exposed to the flow, however, the rate of erosion at that region was noticeably weakened. Although the exposed area of the matrix enlarged in time, it eventually stopped at a constant shape. It was also found that some locations 40° on either side of the pier's leading edge, some of the sediment inside the tires was eroded. The scour depth at these spots, however, terminated at a constant value comparable to the size of the diameter of the tire.

Figure 8B:
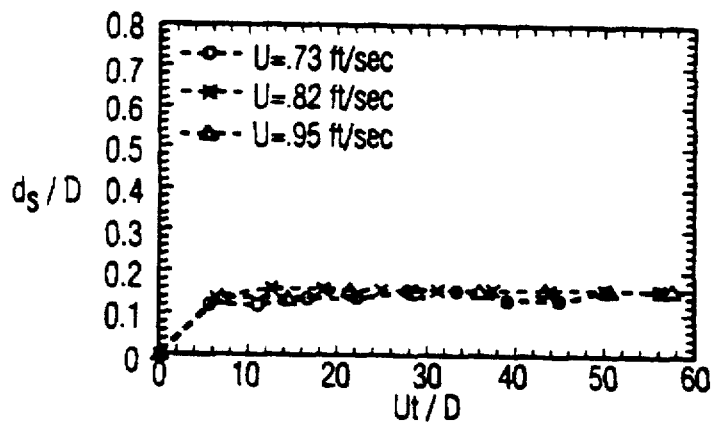

FIG. 8B illustrates the effects of flow velocity on the performance of the scrap tire matrix in mitigating the local scour around the circular pier. The terminating scour depth $d_s/D$ developed inside the tires is independent of the Reynolds number for the limited range of velocities tested, although Table 2A shows that the size of the scoured area increases with Reynolds number.

TABLE 2A (h/D = 2.2)

| U (ft/sec) | $x_s/D$ | $y_s/D$ |
|---|---|---|
| 0.73 | 0.84 | 1.15 |
| 0.82 | 1.05 | 1.30 |
| 0.95 | 1.16 | 1.45 |

Figure 9B:
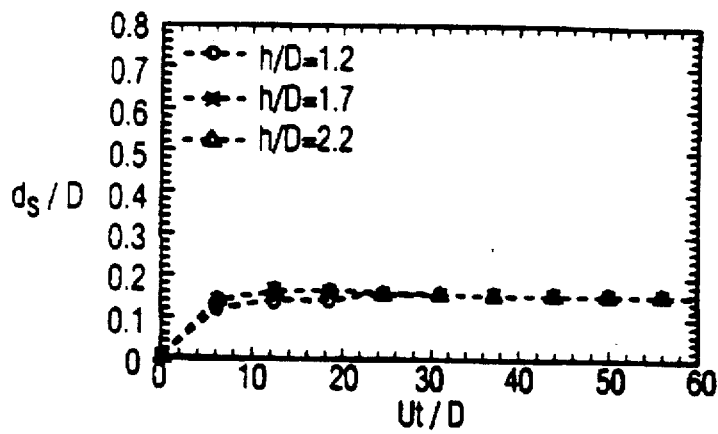

Therefore, an increase of Reynolds number generally causes more area of the matrix to be exposed, but the maximum scour depth in the vicinity of the pier is limited. The effects of flow depth on the depth of the scour hole and size of the scoured area are plotted in FIG. 9B and tabulated in Table 2B.

TABLE 2B (U = 0.82 ft/sec)

| h/D | $x_s/D$ | $y_s/D$ |
|---|---|---|
| 1.2 | 1.08 | 1.30 |
| 1.7 | 1.05 | 1.30 |
| 2.2 | 1.05 | 1.30 |

The local scour developed around the pier was insensitive to changes of flow depth within the specified range of flow conditions, again as expected.

In comparing the size of the scoured area tabulated in Table 2 to that of the baseline unprotected pier in Table 1, it is found that the resultant scour area of the pier protected in accordance with the present invention generally has smaller dimensions in length and width. Moreover, from the maximum scour depths plotted in FIGS. 8 and 9, the scour depth developed with the present invention in place converged to a much lower value and at a faster rate than that of the unprotected circular pier. Considering the values of the scour depth for the Reynolds number of $2.4 \times 10^4$ (U=0.95 ft/sec) at Ut/D=60, it is shown that a matrix system according to the present invention reduced the local scour depth by 79% as compared to a prior art unprotected bridge pier.

Comparative Example 1

Figure 10:
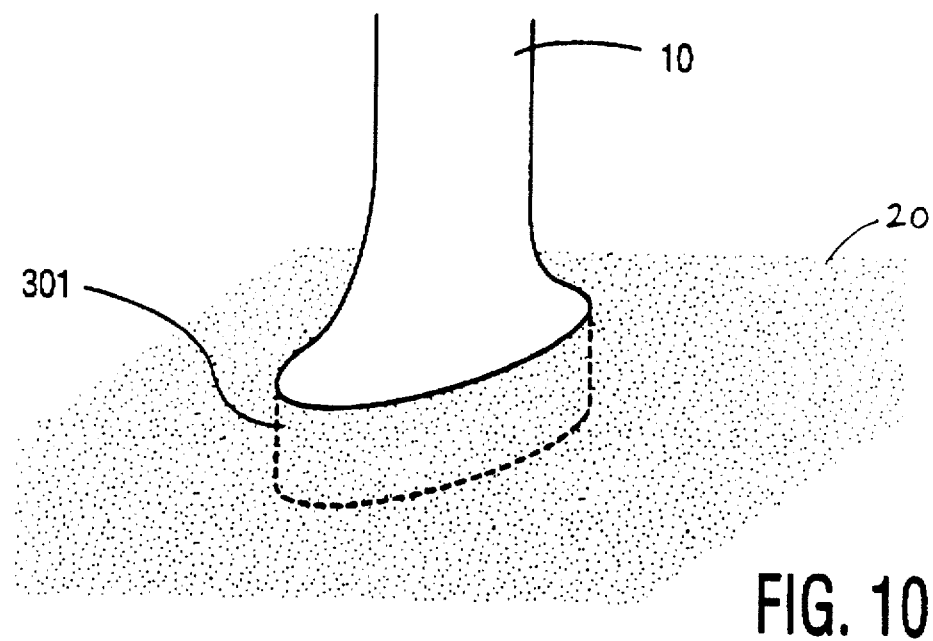
FIG. 10 depicts the model bridge pier with a strake tested as a first comparative example in the flume depicted in FIG. 7.

Unlike the unprotected circular pier, a pier retrofitted with a strake 301 as shown in FIG. 10, exhibited a local scour that initiated at about ±65° from the leading edge of the cylinder and developed slowly into an oval-shaped scour hole.

The strake 301 is a ramped surface at the leading and trailing edges at the foot of the cylinder 10'. A well designed strake acts like a swept leading edge of an airfoil, moving the stagnation point of the approaching flow upward and out of the boundary layer to keep the flow attached. Accordingly, its intended effect is to reduce the strength of the horseshoe vortex shed from the leading edge of the pier (see FIG. 1). The model strake used for the present test had a maximum width in the y direction of 3 inches and a maximum length in the x direction of 9¼ inches.

Through flow visualization with color dye, it was found that the position of the horseshoe vortex at the leading edge of the pier was lifted from the junction at the sand bed to a higher location at the strake, and the legs of the horseshoe vortex were found draping over the sides of the strake. As a result, the velocity gradient and the shear stresses of the flow in close proximity to the sand bed were greatly weakened, leading to a shallower depression of the scour hole. In addition to mitigating the local scour around the pier, since the strake provided a more streamlined flow pattern around the pier, it was observed that the undulating sand dunes induced by the wake behind the pier were less vigorous with the strake installed.

To examine the effects of the Reynolds/Richardson number on the local scour around the circular pier retrofitted with the strake, while keeping all other parameters constant and with the flow depth h/D=2.2, the velocity of the free stream was varied in different tests and the size of the scour hole was measured. The resultant maximum scour hole depth $d_s/D$ is plotted over time in FIG. 8C, while the resultant length and width of the scour hole were tabulated in Table 3A.

TABLE 3A

| (h/D = 2.2) | | |
|---|---|---|
| U (ft/sec) | $x_s/D$ | $y_s/D$ |
| 0.73 | 1.26 | 0.76 |
| 0.82 | 1.26 | 0.81 |
| 0.95 | 1.68 | 1.27 |

As that data shows, an increase of flow velocity generally led to a bigger and deeper scour hole. The underlying cause of this is similar to that for the baseline configuration of an unprotected pier, where the increase of free stream velocity induces an increase of the strength of the horseshoe vortex and leads to more extensive scour.

Figure 9C:
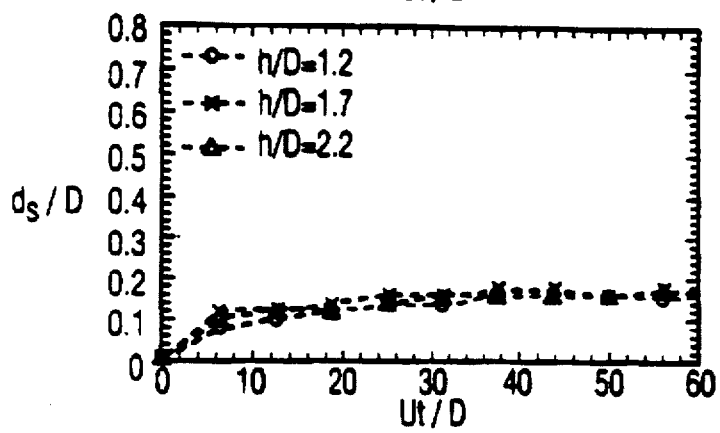

The effects of flow depth on scouring were obtained by varying the flow depths as before at a constant Reynolds number of $2.1 \times 10^4$; the maximum scour depth development is plotted in FIG. 9C and the size of the resultant scour hole is shown in the Table 3B.

TABLE 3B

| (U = 0.82 ft/sec) | | |
|---|---|---|
| h/D | $x_s/D$ | $y_s/D$ |
| 1.2 | 1.26 | 0.84 |
| 1.7 | 1.26 | 0.81 |
| 2.2 | 1.26 | 0.81 |

Both sets of results show that the scour depth is insensitive to changes of flow depth within the range of parameters tested, again as expected.

To evaluate the success of the strake design in mitigating local scour around the pier, the length and width of the resultant scour hole tabulated in Table 3 can be compared to that of the baseline unprotected pier in Table 1. It was observed that the size of the eroded area for the pier retrofitted with the strake is generally smaller than that of the unprotected pier. By comparing the maximum scour depth developed with the strake to that occurring with the unprotected circular pier, it was found that with the installation of the strake, the scour depth leveled off to a lower rate of increase and produced shallower scour hole after any given time. For instance, when the Reynolds number is $2.4 \times 10^4$, the reduction of scour depth at Ut/D=60 is about 65%.

Therefore, the strake design was identified to be a fairly effective device in alleviating the vorticity at the junction between the pier structure and the sand bed, causing less erosion to the bed materials.

Figure 8C:
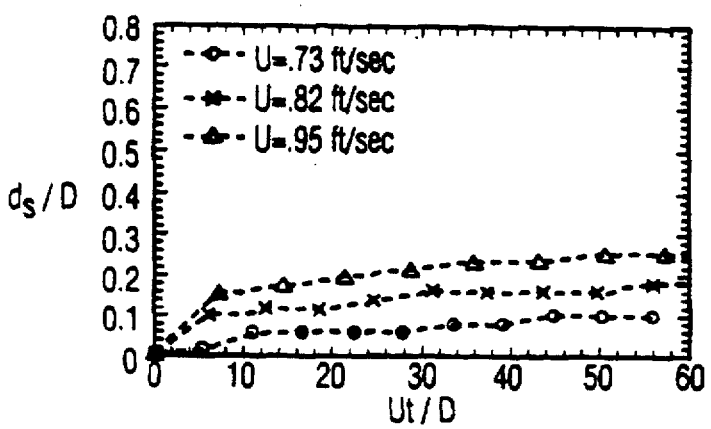

However, when compared to the present invention, FIGS. 8B and 8C show that the scour depth $d_s/D$ for the strake still appears to have been increasing slightly at Ut/D=60, while the scour depth with the present invention installed quickly leveled off to a stable value. Moreover, the scour depth with the strake increased with increasing Reynolds number (increasing velocity), but with the present invention the scour depth quickly reached a maximum value for all Reynolds numbers tested.

Comparative Example 2

Figure 11:
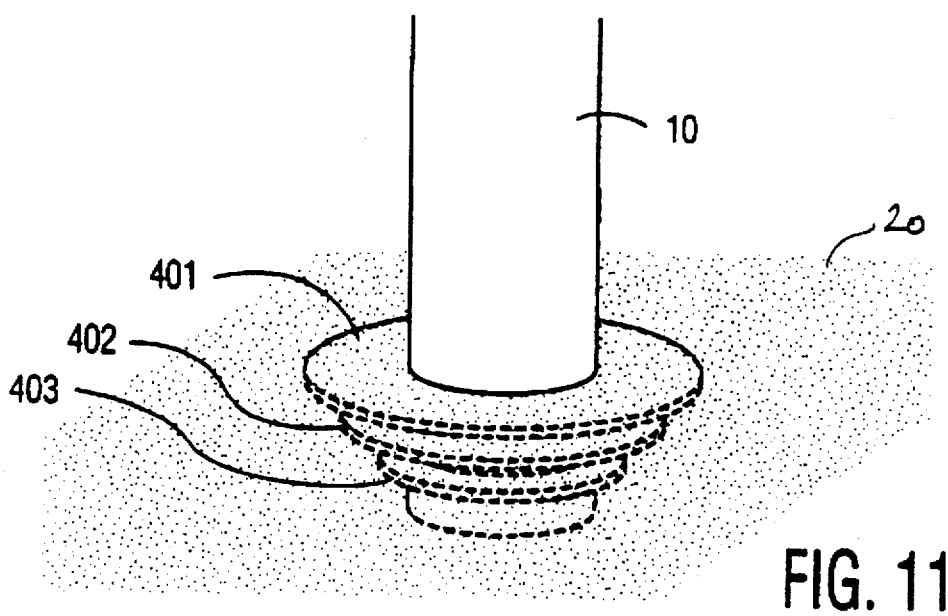
FIG. 11 depicts the model bridge pier with washers tested as a second comparative example in the flume depicted in FIG. 7.

A stacked washer system as shown in FIG. 11 was buried 0.25 inch under the sand level. For this test, the top washer 401 was 7¾ inches in diameter, the second washer 402 was 6¼ inches in diameter, and the third washer 403 was 4¾ inches in diameter. Each washer was ⅞ inch from the adjacent one. The initiation of the local scour around the pier retrofitted with the washers was found to resemble that of an unprotected pier until the first washer was exposed from beneath the sand. Since the sand beneath the washer was protected from the erosive vortical flow, no sediment transport was observed there and the scour depth was technically terminated at the first washer. The exposed area of the washer, however, enlarged in time and eventually converged to a constant shape.

Figure 8D:
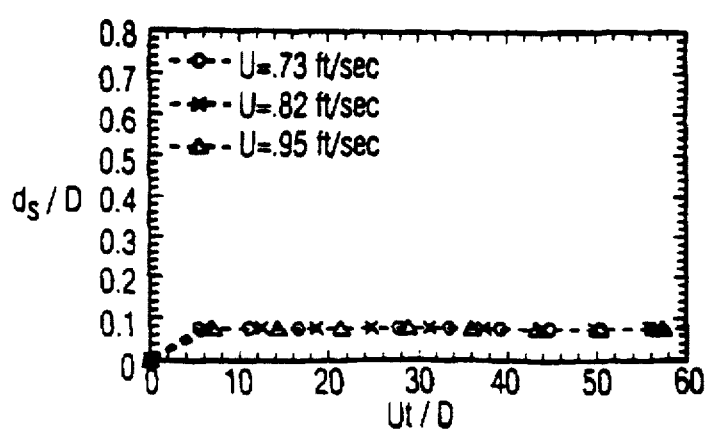

FIG. 8D illustrates the maximum scour depth measured in the vicinity of the pier at different Reynolds numbers and a constant flow depth of h/D=2.2. Within the range of Reynolds numbers tested, the scour depth generally terminated at the top washer and therefore had little response to the change of Reynolds number. For the length and width of the scour hole as tabulated in Table 4A, however, with a constant flow depth of h/D=2.2, the size of the eroded area was found to enlarge with an increased of the Reynolds number.

TABLE 4A

| (h/D = 2.2) | | |
|---|---|---|
| U (ft/sec) | $x_s/D$ | $y_s/D$ |
| 0.73 | 0.81 | 1.05 |
| 0.82 | 0.90 | 1.21 |
| 0.95 | 1.33 | 1.53 |

Figure 9D:
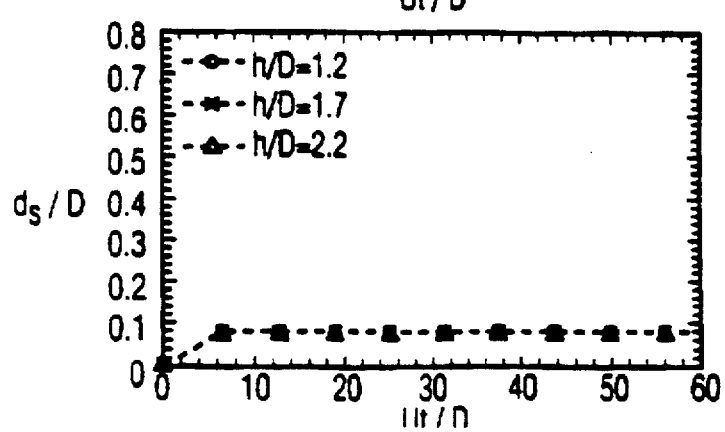

FIG. 9D shows the effects of flow depth on the scour depth at a constant Reynolds number of $2.1 \times 10^4$ while Table 4B shows the flow depth effects on the size of the scoured area. Again, the flow depth had little influence on the local scour around the pier that was retrofitted with the stacked washers.

TABLE 4B

| (U = 0.82 ft/sec) | | |
|---|---|---|
| h/D | $x_s/D$ | $y_s/D$ |
| 1.2 | 0.90 | 1.18 |
| 1.7 | 0.93 | 1.21 |
| 2.2 | 0.90 | 1.21 |

Comparing the lengths and widths of the scour hole tabulated in Table 4 with those of the baseline configuration in Table 1, it was found that the size of the eroded area was generally smaller when the pier was retrofitted with the stacked washers. Moreover, from the evolution of the maximum scour depths illustrated in FIGS. 8A and 8D, it was found that the local scour of the protected pier leveled off to a constant depth much faster and at a lower value than that of the unprotected baseline configuration. Considering the case with a Reynolds number of $2.4 \times 10^4$, the reduction of maximum scour depth at Ut/D=60 with the stacked washers installed was about 90%. These experimental results evidently indicate that the concept of stacked washers would also theoretically be an effective candidate for mitigating local scour around piers. However, the stacked washer system is of limited practicability. For one thing, it would be more difficult to retrofit existing bridge piers with such a system than simply to build a matrix in accordance with the present invention. And it would be commensurately more difficult to build a bridge pier with such structure than to install a matrix in accordance with the present invention at the time of construction. In addition, such a stacked washer system has no impact on reducing the accumulation of used vehicle tires.

It will be appreciated from the above description that the present invention is not limited to use with a circular bridge pier. FIGS. 12A to 12D show other common bridge pier configurations with which the present invention can be used.

Figure 12A:
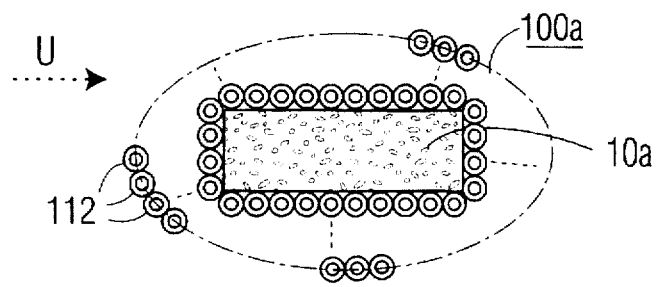
FIGS. 12A to 12D depict matrixes of stacked vehicle tires surrounding alternate forms of bridge piers in accordance with the present invention.
Figure 12B:
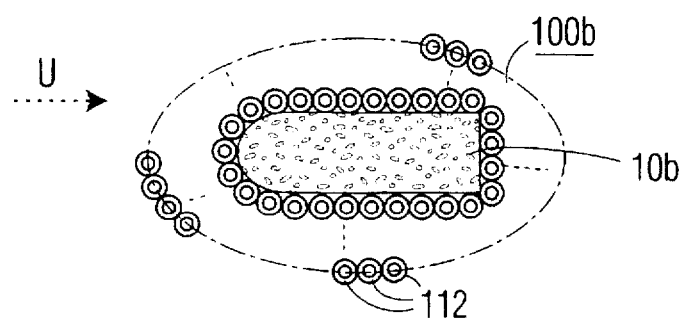
Figure 12C:
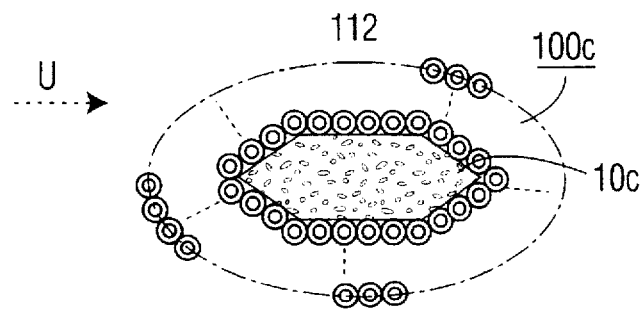
Figure 12D:
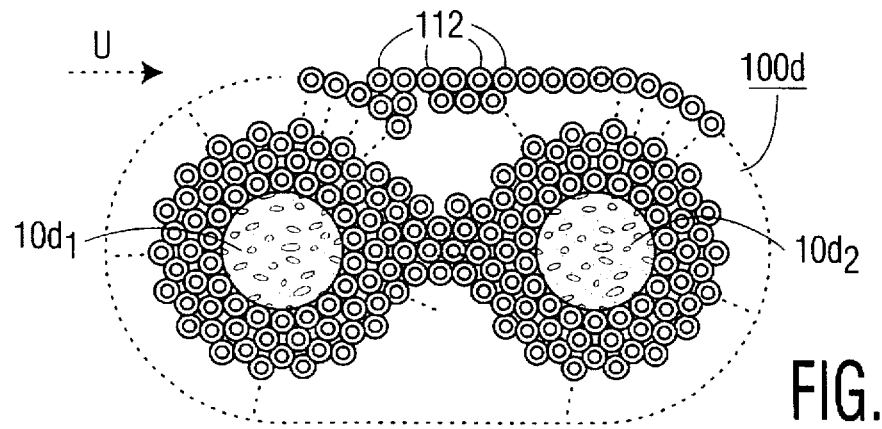

FIG. 12A shows a rectangular bridge pier 10a with a matrix 100a of used vehicle tires completely surrounding it. FIG. 12B shows a generally rectangular bridge pier 106 with a curved nose, again with a similar matrix 100b of used vehicle tires completely surrounding it. FIG. 12C shows a bridge pier 10c with pointed ends, having a matrix 100c surrounding it. FIG. 12D shows a bridge pier comprising two spaced apart circular piers $10d_1$ and $10d_2$. The matrix 100d completely surrounds both piers. FIGS. 12A to 12D also illustrate the advantages of having the matrix extend in all directions from the submerged structure to be protected. In the pier configurations shown in these drawings, a change in the direction of the flow (shown in a nominal direction U), will create complex flow patterns at the base of the piers 10a–10d. By having the matrix extend in all directions from the pier, it will alleviate scouring under all such flow conditions. Of course, the characteristic dimension and the distance from the center of the submerged structure (D and S, respectively, for a circular pier) will be measured accordingly for different pier sections.

The present invention has been described herein in connection with specific embodiments, but those skilled in the art will appreciate that modifications other than those specifically pointed out can be made without departing from the spirit of the invention. Accordingly, the scope of the invention is defined solely by the following claims.

What is claimed is:

1. A system for alleviating scouring at the base of a structure anchored in a sedimentary bed having properties that render the surface thereof subject to scouring from shear stress created by a liquid flowing over the bed and around the structure, said system comprising:

a plurality of hollow, elongated members, each of said members including a plurality of vehicle tires secured together with the toroidal axes thereof aligned to form a stack of said tires; and means for securing said plurality of stacks of tires proximate to the structure in a two-dimensional matrix of said stacks arranged around the structure, said stacks being secured together with a bottom of each on the sedimentary bed and a longitudinal axis of each disposed substantially vertically, each of said stacks including at least three of said tires to provide a cavity having a length sufficient to enable vortical flow to be induced within said cavity by flow of the liquid over a top end thereof and to enable an irregular surface formed by inner side walls of said tires to attenuate the energy in the vortical flow, said matrix reducing the velocity of the liquid flow at the bottom of said stacks and reducing the shear stress on a portion of the bed covered by the matrix.

2. A system as in claim 1, wherein said matrix is buried in the bed when a velocity of the liquid flow is a reference value representing normal flow of the liquid.

3. A system as in claim 2, wherein a cross-section of the structure has a characteristic dimension D, the matrix extends a distance S from a central location of the structure cross-section, and S is a predetermined proportion relative to D.

4. A system as in claim 2, wherein a line extending outwardly from the structure along a top surface of said buried matrix forms a predetermined angle α with a surface of the bed.

5. A system as in claim 1, wherein said structure is a pier anchored in the sedimentary bed and said matrix completely surrounds said pier in all directions.

6. A system as in claim 5, wherein said pier is substantially circular in cross-section with a diameter D and said matrix is substantially circular in plan extending a distance S from a central location of said pier, and S is a predetermined proportion relative to D.

7. A system as in claim 5, wherein said pier is elongated in cross-section and said matrix extends substantially the same distance in all directions from said pier member.

8. A system as in claim 7, wherein said pier includes two spaced apart pier members.

9. A system as in claim 5, wherein a line extending outwardly from said pier along a top surface of said matrix forms a predetermined angle α with a surface of the bed.

10. A system as in claim 5, wherein said pier is anchored in a river bed.

11. A system as in claim 5, wherein said pier is anchored in a bed of a tidal flow.

12. A method of installing a system for alleviating scouring according to claim 1, said method comprising the steps of:

excavating a portion of the bed proximate to the structure to a predetermined depth; and installing said system in said excavated portion of the bed.

13. A method as in claim 12, wherein each of said stacks of tires comprises a predetermined number of tires so that a line extending along a top surface of said matrix will form a predetermined angle α with a surface of the bed.

14. A system as in claim 1, wherein said tires are used vehicle tires.

15. A system as in claim 14, further comprising means for anchoring said stacks in the bed.

16. A system as in claim 15, wherein said anchoring means comprises stakes extending through said tires into the bed.

17. A system as in claim 14, further comprising connecting means for holding said tires in place in each said stack.

18. A system as in claim 17, wherein said securing means comprises brackets for securing together adjacent said tires in adjacent said stacks.

19. A system as in claim 18, wherein said securing means further comprises brackets for securing to the structure said stacks adjacent thereto.

20. A system as in claim 19, further comprising means for anchoring said stacks in the bed.

21. A system as in claim 14, wherein said securing means secures said stacks together and secures said matrix to the structure.

* * * * *